United States Patent
Stephenson, III et al.

(10) Patent No.: US 7,333,166 B2
(45) Date of Patent: Feb. 19, 2008

(54) MATRIX DISPLAY THROUGH THERMAL TREATMENT

(75) Inventors: Stanley W. Stephenson, III, Spencerport, NY (US); Terry J. Martin, Rochester, NY (US)

(73) Assignee: Industrial Technology Research Institute, Chutung, Hsinchu (TW)

( * ) Notice: Subject to any disclaimer, the term of this patent is extended or adjusted under 35 U.S.C. 154(b) by 237 days.

(21) Appl. No.: 10/851,714

(22) Filed: May 21, 2004

(65) Prior Publication Data

US 2005/0259211 A1  Nov. 24, 2005

(51) Int. Cl.
*G02F 1/1333*  (2006.01)
*C09K 19/02*  (2006.01)

(52) U.S. Cl. .......................... 349/88; 349/175; 349/176

(58) Field of Classification Search .................. 349/88, 349/175, 176
See application file for complete search history.

(56) References Cited

U.S. PATENT DOCUMENTS

| | | | |
|---|---|---|---|
| 3,585,381 A * | 6/1971 | Hodson et al. ............... 349/21 |
| 3,600,060 A | 8/1971 | Kettering | |
| 3,816,786 A | 6/1974 | Churchill | |
| 4,435,047 A | 3/1984 | Fergason | |
| 5,251,048 A | 10/1993 | Doane et al. | |
| 5,570,216 A | 10/1996 | Lu et al. | |
| 6,061,107 A | 5/2000 | Yang et al. | |
| 6,236,442 B1 | 5/2001 | Stephenson et al. | |
| 6,423,368 B1 * | 7/2002 | Stephenson et al. .......... 427/64 |
| 6,589,326 B1 | 7/2003 | Howe et al. | |
| 2002/0027630 A1 * | 3/2002 | Yamada et al. ............. 349/123 |

FOREIGN PATENT DOCUMENTS

EP    1 347 329    9/2003

* cited by examiner

*Primary Examiner*—Michael H. Caley
(74) *Attorney, Agent, or Firm*—Akin, Gump, Strauss, Hauer & Feld LLP

(57) ABSTRACT

The present invention relates to a display comprising a substrate, a patterned conductor, and a liquid crystal material having cleared areas and electrically writeable areas. The invention also relates to a method for making a display comprising providing a substrate having a patterned conductor thereon, applying a non-cleared liquid crystal material to the substrate, clearing the non-cleared liquid crystal material to produce a cleared liquid crystal material, applying a field to the patterned conductor to produce an image comprised of areas of cleared liquid crystal material and electrically writeable areas of crystal material.

21 Claims, 7 Drawing Sheets

HEAT-TREATED
PLANAR

HEAT-TREATED
FOCAL-CONIC

AS-COATED
PLANAR

AS-COATED
FOCAL-CONIC

FIG. 11
(PRIOR ART)

HEAT-TREATED
PLANAR

HEAT-TREATED
FOCAL-CONIC

MATRIX DISPLAY THROUGH THERMAL TREATMENT

FIELD OF THE INVENTION

The present invention relates to liquid crystal displays having a bright as-coated state between conductors.

BACKGROUND OF THE INVENTION

Currently, information is displayed using assembled sheets of paper carrying permanent inks or displayed on electronically modulated surfaces such as cathode ray displays or liquid crystal displays. Printed information displayed in these manners cannot be changed. Devices that allow for the modification of information, such as electrically updated displays, are often heavy and expensive. Information may also be applied to sheet materials via magnetically written areas, for example, to carry ticketing or financial information. Such magnetically written data, however, is not visible.

Media systems exist that maintain electronically changeable data without power. Such system can be electrophoretic (Eink), Gyricon, or polymer dispersed cholesteric materials. An example of such electronically updateable displays can be found in U.S. Pat. No. 3,600,060, which shows a device having a coated, then dried emulsion of cholesteric liquid crystals in aqueous gelatin to form a field-responsive, bistable display. U.S. Pat. No. 3,816,786 also discloses a layer of encapsulated cholesteric liquid crystal responsive to an electric field. The electrodes in the patent can be transparent or nontransparent and formed of various metals or graphite. It is disclosed that one electrode must be light absorbing, and it is suggested that the light absorbing electrode be prepared from paints containing conductive material such as carbon.

Fabrication of flexible, electronically written display sheets is disclosed in U.S. Pat. No. 4,435,047. A substrate supports a first conductive electrode, one or more layers of encapsulated liquid crystals, and a second electrode of electrically conductive ink. The conductive inks form a background for absorbing light, so that the information-bearing display areas appear dark in contrast to background non-display areas. Electrical potential applied to opposing conductive areas operates on the liquid crystal material to expose display areas. Because the liquid crystal material is nematic liquid crystal, the display ceases to present an image when de-energized, that is, in the absence of a field. Nematic material between conductors is permanently fixed in an as-coated state. The patent further discloses the use of a chiral dopant. The dopant improves the response time of the nematic liquid crystal, but does not cause the nematic host to operate in a bistable light reflective state.

U.S. Pat. No. 5,251,048 discloses a light modulating cell having a polymer dispersed chiral nematic liquid crystal. The chiral nematic liquid crystal has the property of being electrically driven between a planar state, reflecting a specific visible wavelength of light, and a focal conic state, transmitting forward scattering light. Chiral nematic liquid crystals, also known as cholesteric liquid crystals, potentially in some circumstances have the capacity of maintaining one of multiple given states in the absence of an electric field. A first glass substrate is patterned. A second patterned glass substrate is fixably spaced from the first substrate. The cavity is filled with liquid crystal. Cholesteric material in the cell not operated by both electrodes remains in an optical state defined by the cell-filling operation.

U.S. Pat. No. 6,236,442 to Stephenson et al. discloses a display sheet with a metallic conductive layer over a cholesteric layer. A process is disclosed for vacuum depositing a continuous metallic layer and laser patterning the metallic layer to form segment electrodes. Cholesteric material in areas having removed vacuum coated metal conductor is unresponsive to imaging fields and remains in an as-coated optical state.

Problem to be Solved

There remains a need for matrix displays having a liquid crystal layer, most preferably a coated polymer dispersed chiral nematic layer, with low contrast due to bright, inactive materials unaffected by electrical field after coating. Contrast would be improved if unaffected material were changed to a dark state.

SUMMARY OF THE INVENTION

The present invention relates to a display comprising a substrate, a patterned conductor, and a liquid crystal material having cleared areas and electrically writeable areas. The invention also relates to a method for making a display comprising providing a substrate having a patterned conductor thereon, applying a non-cleared liquid crystal material to the substrate, clearing the non-cleared liquid crystal material to produce a cleared liquid crystal material, applying a field to the patterned conductor to produce an image comprised of areas of cleared liquid crystal material and electrically writeable areas of liquid crystal material.

Advantageous Effect of the Invention

The invention has the advantage of improving the contrast ratio of liquid crystal displays, most preferably coated polymeric dispersed chiral nematic or cholesteric displays.

DETAILED DESCRIPTION OF THE INVENTION

The present invention relates to a display and method of making the display comprising a substrate, a patterned conductor, and a liquid crystal material having cleared areas and electrically writable areas.

A display typically includes a first conductive layer, which is patterned to form a set of closely spaced linear conductor segments. Optionally, the display may include a second conductive layer, which is patterned to form a second set of closely spaced conductor segments anti-parallel to the first set of conductor segments. The two sets of conductor segments are disposed on either side of an electrically responsive medium. Voltage may be applied to conductors on either side to impose a field across the medium that change the optical state of the medium. Such an organization forms a matrix display, which may also be referred to as a matrix addressable display.

Materials responsive to the applied field are considered electrically writable. Media that maintain a given optical state in after a field has changed state can furthermore comprise writable media. The electrically writable material can have multiple optical states. Optical states can include varying states of reflection, absorption, transmission or scattering. In the case of optical material having a substantial transmissive state, the state can be considered clear, meaning transmissive of optical radiation. A clearing processes changes material from a nonclear state, for instance a reflective, scattering or absorbing state, into a substantially transparent state.

Liquid crystal mixtures used in display applications have ordered molecular states at room temperature. The ordered structure is formed by electrical anisotropy of the molecules. Displays are fabricated so that the liquid crystal material within in the display is in a molecular state that is not fully or maximally transparent or clear. The liquid crystal material is considered nonclear or unclear in the as-manufactured state. Liquid crystal mixtures cease to have ordered structure at a high enough temperature. The molecules in this state are isotropic, having uniform electrical and optical properties. The temperature at which the thermodynamic forces disrupt the order of the molecules is known as the clearing temperature.

The support, also referred to herein as the substrate, bears an electrically modulated imaging layer on at least one surface. A suitable material may include electrically modulated material disposed on a suitable support structure, such as on or between one or more electrodes. The term "electrically modulated material" as used herein is intended to include any suitable nonvolatile material. Suitable materials for the electrically modulated material are described in U.S. patent application Ser. No. 09/393,553 and U.S. Provisional Patent Application Ser. No. 60/099,888, the contents of both applications are herein incorporated by reference.

The electrically modulated material may also be a printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid-filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. No. 6,147,791, U.S. Pat. No. 4,126,854 and U.S. Pat. No. 6,055,091, the contents of which are herein incorporated by reference.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material material. According to a preferred embodiment, the particle diameters of the microcapsules are between about 5 microns and about 200 microns, and the particle diameters of the charged particles are between about one-thousandth and one-fifth the size of the particle diameters of the microcapsules.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically modulated material may also include surface stabilized ferroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material display material may have different properties or colors. Moreover, the characteristics of the various layers may be different from each other. For example, one layer can be used to view or display information in the visible light range, while a second layer responds to or emits ultraviolet light. The non-visible layers may alternatively be constructed of non-electrically modulated material based materials that have the previously listed radiation absorbing or emitting characteristics. The electrically modulated material employed in connection with the present invention preferably has the characteristic that it does not require power to maintain display of indicia.

The preferred electrically modulated imaging layer comprises a liquid crystalline material. Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

Chiral nematic liquid crystal refers to the type of liquid crystal having finer pitch than that of twisted nematic and super-twisted nematic used in commonly encountered LC devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference.

In one embodiment, a chiral nematic liquid crystal composition may be dispersed in a continuous matrix. Such materials are referred to as "polymer dispersed liquid crystal" materials or "PDLC" materials. Such materials can be made by a variety of methods. For example, Doane et al. (Applied Physics Letters, 48, 269 (1986)) disclose a PDLC comprising approximately 0.4 mm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

In one embodiment, the liquid crystal may be applied as a substantial monolayer. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such a structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. The nematic liquid crystal phases typically consist of 2 to 20, preferably 2 to 15 components. The list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100. TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, Mol. Cryst. Liq. Crys., 123, 377 (1985); G. Spada and G. Proni, Enantiomer, 3, 301 (1998), U.S. Pat. No. 6,217,792; U.S. Pat. No. 6,099,751; and U.S. patent application Ser. No. 10/651,692, hereby incorporated by reference.

Chiral nematic liquid crystal materials and cells, as well as polymer stabilized chiral nematic liquid crystals and cells, are well known in the art and described in, for example, Ser. No. 07/969,093; Ser. No. 08/057,662; Yang et al., Appl. Phys. Lett. 60 (25) pp 3102-04 (1992); Yang et al., J. Appl. Phys. 76 (2) pp 1331 (1994); published International Patent Application No. PCT/US92/09367; and published International Patent Application No. PCT/US92/03504, all of which are incorporated herein by reference.

The liquid crystalline droplets or domains may be formed by any method, known to those of skill in the art, which will allow control of the domain size. Liquid crystal domains are preferably made using a limited coalescence methodology, as disclosed in U.S. Pat. Nos. 6,556,262 and 6,423,368, incorporated herein by reference. Limited coalescence is defined as dispersing a light modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

An immiscible, field-responsive light modulating material along with a quantity of colloidal particles is dispersed in an aqueous system and blended to form a dispersion of field-responsive, light modulating material below a coalescence size. When the dispersion, also referred to herein as an emulsion, is dried, a coated material is produced which has a set of uniform domains having a plurality of electrically responsive optical states. The colloidal solid particle, functioning as an emulsifier, limits domain growth from a highly dispersed state. Uniformly sized liquid crystal domains are created and machine coated to manufacture light modulating, electrically responsive sheets with improved optical efficiency.

Specifically, a liquid crystal material may be dispersed an aqueous bath containing a water soluble binder material such as deionized gelatin, polyvinyl alcohol (PVA) or polyethylene oxide (PEO). Such compounds are machine coatable on equipment associated with photographic films. Preferably, the binder has a low ionic content, as the presence of ions in such a binder hinders the development of an electrical field across the dispersed liquid crystal material. Additionally, ions in the binder can migrate in the presence of an electrical field, chemically damaging the light modulating layer. The liquid crystal/gelatin emulsion is coated to a thickness of between 5 and 30 microns to optimize optical properties of light modulating layer. The coating thickness, size of the liquid crystal domains, and concentration of the domains of liquid crystal materials are designed for optimum optical properties.

In an exemplary embodiment, a liquid crystalline material is homogenized in the presence of finely divided silica, a coalescence limiting material, (LUDOX® from duPont Corporation). A promoter material, such as a copolymer of adipic acid and 2-(methylamino) ethanol, is added to the aqueous bath to drive the colloidal particles to the liquid-liquid interface. The liquid crystal material is dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy)

approximately 1, 3, and, 8 micron were produced. These emulsions were diluted into gelatin solution for subsequent coating.

Domains of a limited coalescent material maintain their uniform size after the addition of the surfactant and after being machine coated. There were few, if any, parasitic domains having undesirable electro-optical properties within the dried coatings produced by the limited coalescence method. Coatings made using limited coalescence having a domain size of about 2 microns may have the greatest translucence. For constant material concentrations and coating thickness, limited coalescent materials having a domain size of about 2 microns in size are significantly more translucent than any sized domains formed using conventional dispersion.

Sheets made by the limited coalescence process have curves similar to those of conventionally dispersed materials. However, with 8 to 10 micron domains, the material may demonstrate reduced scattering due to the elimination of parasitic domains. Conventionally dispersed chiral nematic or cholesteric materials contain parasitic domains, which reflect light in wavelengths outside the wavelengths reflected by the chiral nematic or cholesteric material. Limited coalescent dispersions have reduced reflection in other wavelengths due to the elimination of parasitic domains. The increased purity of color is important in the development of full color displays requiring well separated color channels to create a full color image. Limited coalescent chiral nematic or cholesteric materials provide purer light reflectance than liquid crystal material dispersed by conventional methods. Such materials may be produced using conventional photographic coating machinery.

In order to provide suitable formulations for applying a layer containing the liquid crystal domains, the dispersions may be combined with a hydrophilic colloid, gelatin being the preferred material. Surfactants may be included with the liquid crystal dispersion prior to the addition of gelatin in order to prevent the removal of the particulate suspension stabilizing agent from the droplets. This aids in preventing further coalescence of the droplets.

As for the suspension stabilizing agents that surround and serve to prevent the coalescence of the droplets, any suitable colloidal stabilizing agent known in the art of forming polymeric particles by the addition reaction of ethylenically unsaturated monomers by the limited coalescence technique can be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent.

Suitable promoters to drive the suspension stabilizing agent to the interface of the droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and methoxycellulose. The preferred promoter is triethylphenyl ammonium chloride.

In order to prevent the hydrophilic colloid from removing the suspension stabilizing agent from the surface of the droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

Suitable hydrophilic binders include both naturally occurring substances such as proteins, protein derivatives, cellulose derivatives (e.g. cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Gelatin, containing hardener, may optionally be used in the present invention. In the context of this invention, hardeners are defined as any additive, which causes chemical crosslinking in gelatin or gelatin derivatives. Many conventional hardeners are known to crosslink gelatin. Gelatin crosslinking agents (i.e., the hardener) are included in an amount of at least about 0.01 wt. % and preferably from about 0.1 to about 10 wt. % based on the weight of the solid dried gelatin material used (by dried gelatin is meant substantially dry gelatin at ambient conditions as, for example, obtained from Eastman Gelatine Co., as compared to swollen gelatin, and more preferably in the amount of from about 1 to about 5 percent by weight. More than one gelatin crosslinking agent can be used if desired. Suitable hardeners may include inorganic, organic hardeners, such as aldehyde hardeners and olefinic hardeners. Inorganic hardeners include compounds such as aluminum salts, especially the sulfate, potassium and ammonium alums, ammonium zirconium carbonate, chromium salts such as chromium sulfate and chromium alum, and salts of titanium dioxide, and zirconium dioxide. Representative organic hardeners or gelatin crosslinking agents may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2 (1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-formaldehyde resins such as Sequa CPD3046-76 obtained from Sequa Chemicals Inc., and 2,3-dihydroxy-1,4-dioxane (DHD). Thus, hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82). Other examples of hardening agents can be found in standard references such as The Theory of the Photographic Process, T. H. James, Macmillan Publishing Co., Inc. (New York 1977) or in Research Disclosure, September 1996, Vol. 389, Part IIB (Hardeners) or in Research Disclosure, September 1994, Vol. 365, Item 36544, Part IIB (Hardeners). Research Disclosure is published by Kenneth Mason Publications, Ltd., Dudley House, 12 North St., Emsworth, Hampshire P0107DQ, England. Olefinic hardeners are most preferred, as disclosed in U.S. Pat. Nos. 3,689,274, 2,994,611, 3,642,486, 3,490,911, 3,635,718, 3,640,720, 2,992,109, 3,232,763, and 3,360,372.

Among hardeners of the active olefin type, a preferred class of hardeners particularly are compounds comprising two or more vinyl sulfonyl groups. These compounds are hereinafter referred to as "vinyl sulfones". Compounds of this type are described in numerous patents including, for example, U.S. Pat. Nos. 3,490,911, 3,642,486, 3,841,872 and 4,171,976. Vinyl sulfone hardeners are believed to be effective as hardeners as a result of their ability to crosslink polymers making up the colloid.

As used herein, the phase a "liquid crystal display" (LCD) is a type of flat panel display used in various electronic devices. At a minimum, an LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic. The LCD may also include functional layers. In one embodiment of an LCD, a transparent, multilayer flexible support is coated with a first conductive layer, which may be patterned, onto which is coated the light modulating liquid crystal layer. A second conductive layer is applied and overcoated with a dielectric layer to which dielectric conductive row contacts are attached, including via that permit interconnection between conductive layers and the dielectric conductive row contacts. An optional nanopigmented functional layer may be applied between the liquid crystal layer and the second conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the LC material, the LC exhibiting different light reflecting characteristics according to its phase and/or state.

There are alternative display technologies to LCDs that can be used, for example, in flat panel displays. A notable example is organic or polymer light emitting devices (OLEDs) or (PLEDs), which are comprised of several layers in which one of the layers is comprised of an organic material that can be made to electroluminesce by applying a voltage across the device. An OLED device is typically a laminate formed in a substrate such as glass or a plastic polymer. A light emitting layer of a luminescent organic solid, as well as adjacent semiconductor layers, are sandwiched between an anode and a cathode. The semiconductor layers can be hole injecting and electron injecting layers. PLEDs can be considered a subspecies of OLEDs in which the luminescent organic material is a polymer. The light emitting layers may be selected from any of a multitude of light emitting organic solids, e.g., polymers that are suitably fluorescent or chemiluminescent organic compounds. Such compounds and polymers include metal ion salts of 8-hydroxyquinolate, trivalent metal quinolate complexes, trivalent metal bridged quinolate complexes, Schiff-based divalent metal complexes, tin (IV) metal complexes, metal acetylacetonate complexes, metal bidenate ligand complexes incorporating organic ligands, such as 2-picolylketones, 2-quinaldylketones, or 2-(o-phenoxy) pyridine ketones, bisphosphonates, divalent metal maleonitriledithiolate complexes, molecular charge transfer complexes, rare earth mixed chelates, (5-hydroxy) quinoxaline metal complexes, aluminum tris-quinolates, and polymers such as poly(p-phenylenevinylene), poly(dialkoxyphenylenevinylene), poly(thiophene), poly(fluorene), poly(phenylene), poly(phenylacetylene), poly(aniline), poly(3-alkylthiophene), poly(3-octylthiophene), and poly(N-vinylcarbazole). When a potential difference is applied across the cathode and anode, electrons from the electron injecting layer and holes from the hole injecting layer are injected into the light emitting layer; they recombine, emitting light. OLEDs and PLEDs are described in the following United States patents, all of which are incorporated herein by this reference: U.S. Pat. No. 5,707,745 to Forrest et al., U.S. Pat. No. 5,721,160 to Forrest et al., U.S. Pat. No. 5,757,026 to Forrest et al., U.S. Pat. No. 5,834,893 to Bulovic et al., U.S. Pat. No. 5,861,219 to Thompson et al., U.S. Pat. No. 5,904,916 to Tang et al., U.S. Pat. No. 5,986,401 to Thompson et al., U.S. Pat. No. 5,998,803 to Forrest et al., U.S. Pat. No. 6,013,538 to Burrows et al., U.S. Pat. No. 6,046,543 to Bulovic et al., U.S. Pat. No. 6,048,573 to Tang et al., U.S. Pat. No. 6,048,630 to Burrows et al., U.S. Pat. No. 6,066,357 to Tang et al., U.S. Pat. No. 6,125,226 to Forrest et al., U.S. Pat. No. 6,137,223 to Hung et al., U.S. Pat. No. 6,242,115 to Thompson et al., and U.S. Pat. No. 6,274,980 to Burrows et al.

In a typical matrix address light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the hole injecting electrode, and a Mg—Ag—ITO electrode layer is used for electron injection.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO_2$, $Zn_2SnO_4$, $Cd_2SnO_4$, $Zn_2In_2O_5$, $MgIn_2O_4$, $Ga_2O_3\text{-}In_2O_3$, or $TaO_3$.

The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin oxide or indium tin oxide (ITO), or polythiophene, with ITO being the preferred material. Typically, the conductive layer is sputtered onto the substrate to a resistance of less than 250 ohms per square. Alternatively, the conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10-120 nm in thickness, or 50-100 nm thick to achieve a resistivity of 20-60 ohms/square on plastic. An exemplary preferred ITO layer is 60-80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned therebetween to form a device. The ITO conductive layer may be patterned to have segments with a variety of dimensions. Exemplary dimensions may include segment line widths of 10 microns, distances between segment lines, that is, electrode widths, of 200 microns, depth of cut, that is, thickness of ITO conductor, of 100 nanometers. ITO thicknesses on the order of 60, 70, and greater than 100 nanometers are also possible.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium tin oxide, resulting in the layer being transparent. Alternatively, second conductive layer may be printed conductive ink.

For higher conductivities, the second conductive layer may comprise a silver-based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned by irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

The LCD may also comprises at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise SiOx, AlOx or ITO. The protective layer, for example an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nano-pigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

Figure 1:
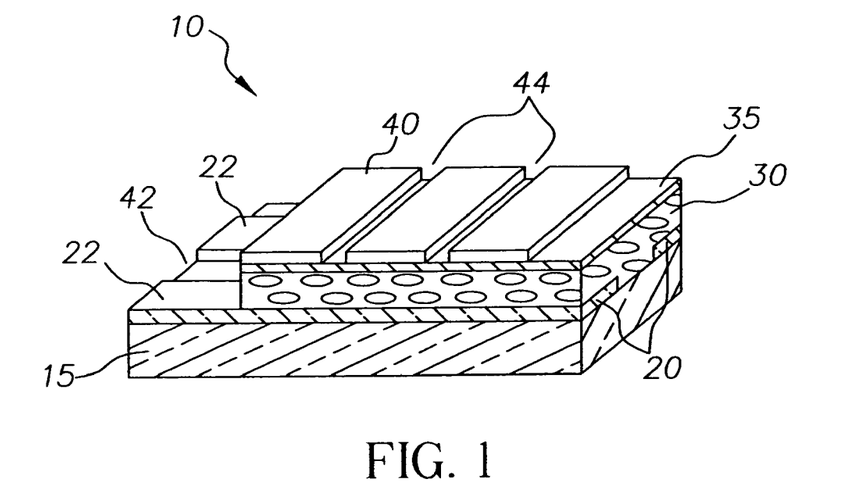
FIG. 1 is a perspective of one embodiment of a display in accordance with the present invention, in which a polymer dispersed liquid crystal material is used.

FIG. 1 is a perspective section view of one preferred embodiment of a display in accordance with the invention, which display employs a liquid crystal, preferably polymer dispersed chiral nematic material. A sheet designated as display 10 is made in accordance with the present invention. Display 10 includes a display substrate 15, which can be a thin transparent polymeric material, such as Kodak Estar® film base formed of polyester plastic that has a thickness of between 20 and 200 micrometers. In an exemplary embodiment, display substrate 15 is a 125-micrometer thick sheet of polyester film base. Other polymers, such as transparent polycarbonate, can also be used.

One or more first transparent conductors 20 are formed on display substrate 15. The first conductive layer is patterned to form a set of adjacent traces or segments organized to form the first set of traces or conductive segments for a matrix display. The gap 42 between the segments of patterned first conductors 20, which may be referred to as the inter-layer gap or, simply, gap, is preferably kept as narrow as possible, while maintaining electrical isolation between adjacent conductor segments 22. A thin portion of chiral nematic or cholesteric material lying in the conductor free area 42 (inter-layer gap) will not respond to applied electrical fields. The first transparent conductive layer can be tin oxide, indium tin oxide (ITO), with ITO being the preferred material. Typically the material of first transparent conductive layer is sputtered or coated as a layer over display substrate 15 having a resistance of less than 1000 ohms per square. First transparent conductors 20 can be formed in the conductive layer by conventional lithographic or laser etching means. Transparent first transparent conductors 20 can also be formed by printing a transparent organic conductor such as PEDT/PSS, PEDOT/PSS polymer, which materials are sold as Baytron® P by Bayer AG Electronic Chemicals. Portions of first transparent conductors 20 can be uncoated to provide exposed first conductors 22 for this embodiment.

Chiral nematic/Cholesteric layer 30 overlays first transparent conductors 20. Chiral nematic/cholesteric layer 30 contains chiral nematic/cholesteric liquid crystal material, such as those disclosed in U.S. Pat. No. 5,695,682 to Doane et al., the disclosure of which is incorporated by reference. Such materials are made using highly anisotropic nematic liquid crystal mixtures and adding a chiral doping agent to provide helical twist in the planes of the liquid crystal to the point that interference patterns are created that reflect incident light. Application of electrical fields of various intensity and duration can be employed to drive a chiral nematic (cholesteric) material into a reflective state, to near transparent or transmissive state, or an intermediate state. These materials have the advantage of having first and second optical states that are both stable in the absence of an electrical field. The materials can maintain a given optical state indefinitely after the field is removed. Chiral nematic/cholesteric liquid crystal materials can be formed, for example, using a two component system such as MDA-00-1444 (undoped nematic) and MDA-00-4042 (nematic with high chiral dopant concentrations) available from E.M. Industries of Hawthorne, N.Y.

Chiral nematic/cholesteric layer 30 may be E.M. Industries' cholesteric material BL-118 dispersed in deionized photographic gelatin. The liquid crystal material is mixed at 8% concentration in a 5% gelatin aqueous solution. The liquid crystal material may be dispersed to create an emulsion having 8-10 micron diameter domains of the liquid crystal in aqueous suspension. The domains can be formed using the limited coalescence technique described in U.S. Pat. No. 6,423,368. The emulsion is coated on a polyester display substrate 15 over the first transparent conductors (also referred to as conductor segments 20 and which are the patterned portions of a first conductive layer) and dried to provide an approximately 9 micron thick polymer dispersed chiral nematic/cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A thin layer of gelatin can be applied over first transparent conductors 20 to provide an insulator prior to applying chiral nematic/cholesteric layer 30 as disclosed copending U.S. Ser. No. 09/915,441 filed Jul. 26, 2001 by Stephenson et al. Coatings made from such emulsions appear bright after coating.

Figure 2:
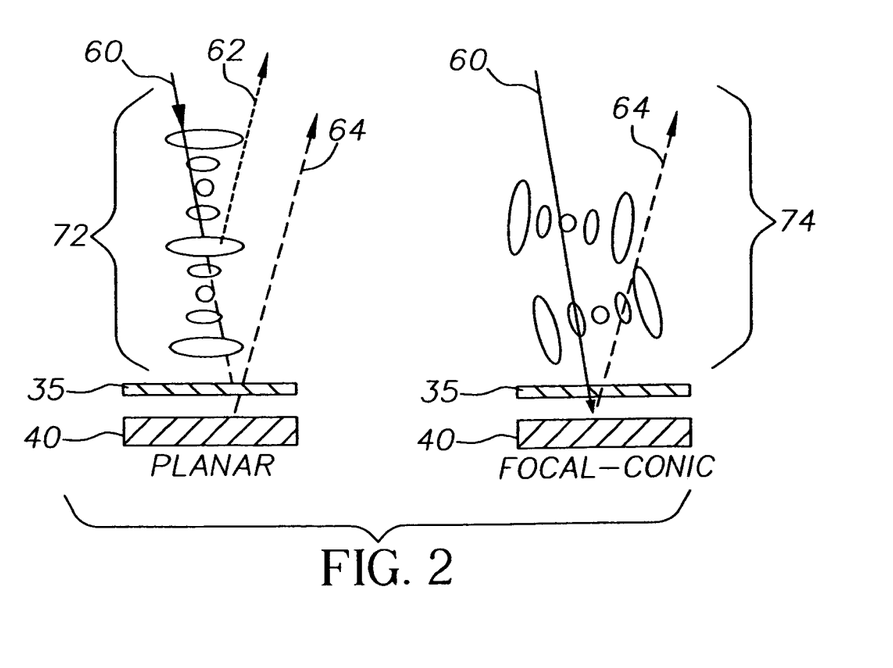
FIG. 2 is a schematic sectional view of a chiral nematic material, respectively, in a planar and focal conic state responding to incident light.

FIG. 2 is a schematic section view of optical states of one embodiment of a display in accordance with the present invention. The left diagram demonstrates the optical path when the chiral nematic/cholesteric material is in a planar state. Incident light 60 strikes planar liquid crystal 72 which reflects a portion of incident light 60 as reflected light 62. The remaining light passes through dark layer 35.

Dark layer 35 can be a complementary light absorbing dye layer that operates on a portion of the light passing through dark layer 35. Particular wavelengths of light are absorbed, and the remaining light strikes reflective second conductive layer patterned to form conductors 40. Light is reflected from second conductors 40 and passes through dark layer 35 a second time, then passes through planar material 72 to become complementary light 64. Complementary light 64 operating in conjunction with chiral nematic/cholesteric liquid crystal having peak reflectance near 575 nanometers together form a substantially color-neutral reflective surface.

On the right side of FIG. 2, the liquid crystal material is in a focal conic state 74 and transmits incident light 60. Dark layer 35 provides complementary light 64 when the liquid crystal material is in a focal conic state. As one alternative, dark layer 35 can be a thin, black layer that absorbs across all wavelengths of light. With a black dark layer 35, when the chiral nematic/cholesteric material is in the focal conic state, the image will be essentially black.

Figure 3:
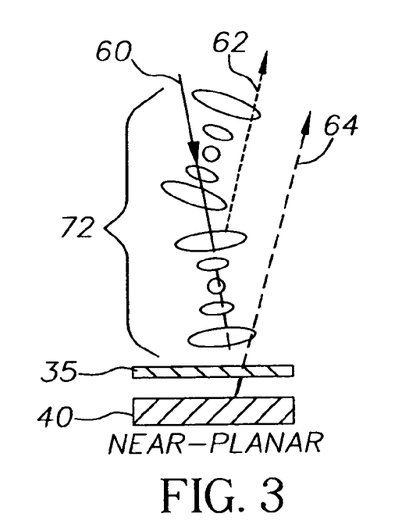
FIG. 3 is a schematic sectional view of an as-coated chiral nematic material responding to incident light.

FIG. 3 is a schematic sectional view of an as-coated chiral nematic material responding to incident light. Polymer dispersed chiral nematic/cholesteric material as-coated assumes a near-planar state ("nP") which is less reflecting compared to the fully or maximally planar state obtained by an electrical field, in an area of an image or other information formed during display use. The amount of reflected light 62 is less than the reflectance of the cholesteric material electrically written into the planar state. The chiral nematic/cholesteric material is bright but does not match the reflectance of the chiral nematic/cholesteric material when it is electronically written into the planar state.

Figure 4:
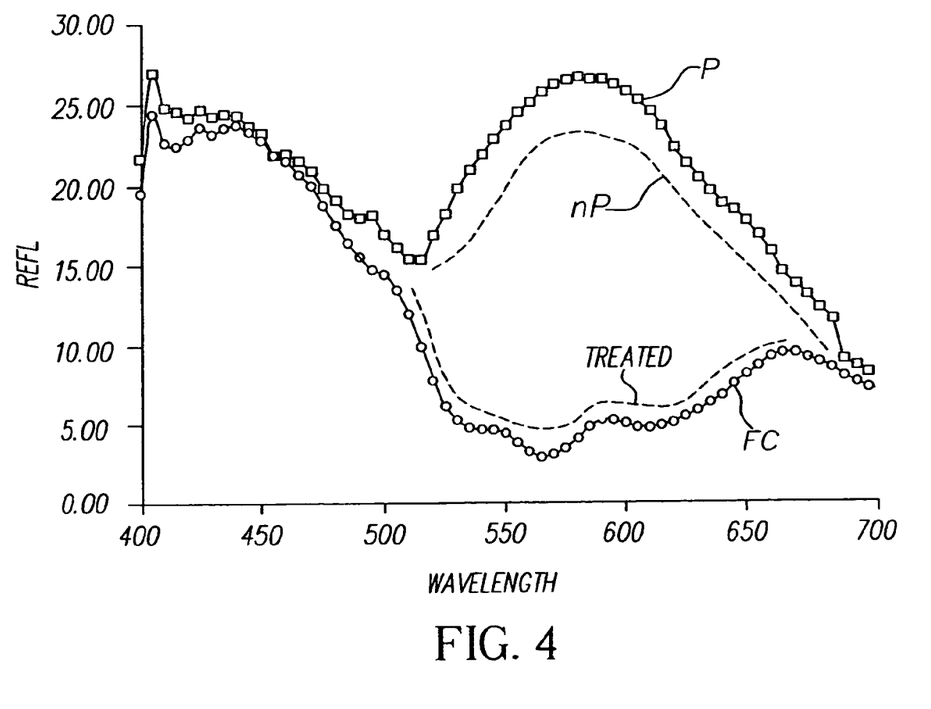
FIG. 4 is a plot of the spectra for a polymer dispersed liquid crystal material in the planar, focal conic, near-planar and treated states.

FIG. 4 is a plot of the spectra for a yellow polymer dispersed chiral nematic/cholesteric liquid crystal material with a blue dark layer in the planar (P), focal conic (FC), treated and near-planar (nP) state. When the chiral nematic/cholesteric material is in the planar state, the display appears substantially color-neutral. When the display is written into the focal conic state, the display appears blue. In the as-coated, electrically unwritten near planar (nP) state, the display has nearly the full reflectance of the planar (P) state. Displays that do not electrically activate the full surface area will have unwritten material between adjacent portions of patterned electrodes, referred to as segments, in a bright, near-planar (nP) state. Similarly, in the case that dark layer is black, the as-coated state in the near-planar (nP) will also differ in reflectance form material electrically written into the planar state.

Returning to FIG. 1, dark layer 35 overlays chiral nematic/cholesteric layer 30. In a preferred embodiment, dark layer 35 is a complementary light absorbing layer composed of pigments that are milled below 1 micrometer to form "nano-pigments" in a binder. Such pigments are very effective in absorbing wavelengths of light in very thin (sub-micrometer) layers. Such pigments can be selected to be electrically inert to prevent degradation interference from electrical display fields applied to display 10. Such pigments are disclosed in copending US Patent Application No. 2004/0032545, hereby incorporated by reference.

In the present embodiment, in FIG. 1, dark layer 35 is coated over chiral nematic/cholesteric layer 30 to provide a light absorbing layer that provides a specific contrast state to reflected light. As mentioned above, dark layer 35 can be designed to provide a specific amount of light at wavelengths not operated on by the chiral nematic/cholesteric liquid crystal to create a more color-neutral image. The coating can be simultaneous with the deposition of chiral nematic/cholesteric layer 30 or as a separate step. In a preferred embodiment, multi-layer coating equipment of the kind used in the photographic industry provides chiral nematic/cholesteric layer 30 and dark layer 35 as two co-deposited layers. Dark layer 35 is significantly thinner than chiral nematic/cholesteric layer 30 and has minimal effect on the electrical field strength required to change the state of the liquid crystal material.

Second conductors 40 overlay dark layer 35. Second conductors in the invention comprise a set of adjacent traces organized to form in conjunction with first conductors 20 a matrix display. The gap 44 between second conductors 40 is preferably kept as narrow as possible, while maintaining electrical isolation between adjacent conductors. A thin portion of chiral nematic/cholesteric material lying in the conductor free area will not experience a change in state, as no field will be applied to these conductor-free areas 44, thereby causing them to remain in the near-planar (nP) state. Second conductors 40 have sufficient conductivity to operate in conjunction with first transparent conductors 20 to induce an electric field across chiral nematic/cholesteric layer 30 strong enough to change the optical state of the polymeric material. Second conductors 40, especially for applications requiring complementary light 64, are preferably formed of reflective metal, for example, by vacuum deposition of conductive and reflective material such as aluminum, chrome or nickel. In the case of vacuum coated second conductors 40, aluminum or silver provide very high reflectance and conductivity. The layer of conductive material can be patterned using well known techniques such as photolithography, laser etching or by application through a mask.

In another embodiment, second conductors 40 can be formed by screen printing a reflective and conductive formulation such as UVAG® 0010 from Allied Photochemical of Kimball, Mich. Such screen printable conductive materials comprise finely divided silver in an ultraviolet curable resin. After printing, the material is exposed to ultraviolet radiation greater than 0.40 Joules/cm$^2$, the resin will polymerize in 2 seconds to form a durable surface. Screen printing is preferred to minimize the cost of manufacturing the display. Alternatively, second conductors 40 can be formed by screen printing a thermally cured silver-bearing resin. An example of such a material is Acheson Electrodag® 461SS, a heat cured silver ink. In the case that the dark layer 35 is black, any type of conductor can be used including black carbon in a binder.

The present invention is applicable to display 10 in FIG. 1, which the display has liquid crystal material in or over the gaps 42 between adjacent first transparent conductors 20 and the gaps 44 between second conductors 40, which liquid crystalline material is nonresponsive to applied electrical field between conductors, since the material is not between segments, and is not in the path of the electrical field between conductors, and maintains a bright, reflective near-planar (nP) state in the as-coated state. This phenomenon is observed after the polymer dispersed chiral nematic/cholesteric liquid crystal is coated and dried in accordance with preferred embodiment.

The use of a flexible support for display substrate 15, thin first transparent conductors 20, machine coated chiral nematic/cholesteric liquid crystal layer 30, and printed second conductors 40 permits the fabrication of a low cost flexible display. Small displays according to the present invention can be used as electronically rewritable tags or labels for inexpensive, rewrite applications.

Figure 5:
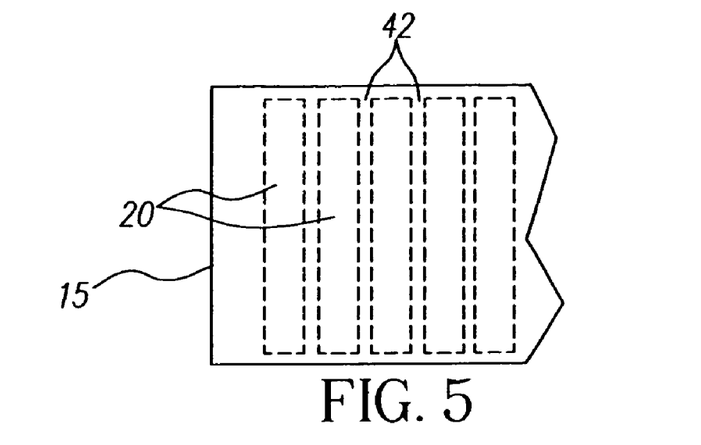
FIG. 5 is a rear view of a sheet in accordance with the present invention having a patterned first conductor.

FIG. 5 is a rear view of a sheet in accordance with the one embodiment of the present invention, which sheet has a patterned first conductor. A substrate 15 is provided with a plurality of patterned first transparent conductors 20. First transparent conductors 20 in the invention comprise a set of adjacent traces organized to form the first set of traces for a matrix display. Preferably, the gap 42 between adjacent transparent first conductors 20 is minimal. Chiral nematic/cholesteric material disposed between conductors does not respond to applied electrical fields.

Figure 6:
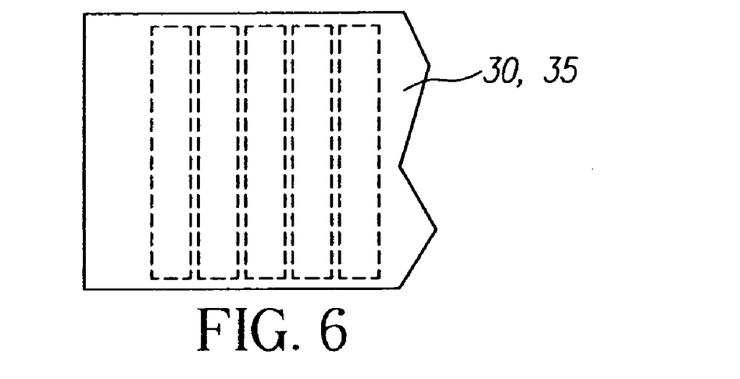
FIG. 6 is a rear view of a sheet in accordance with the present invention having a polymer dispersed cholesteric liquid crystal layer and a dark layer.
Figure 7:
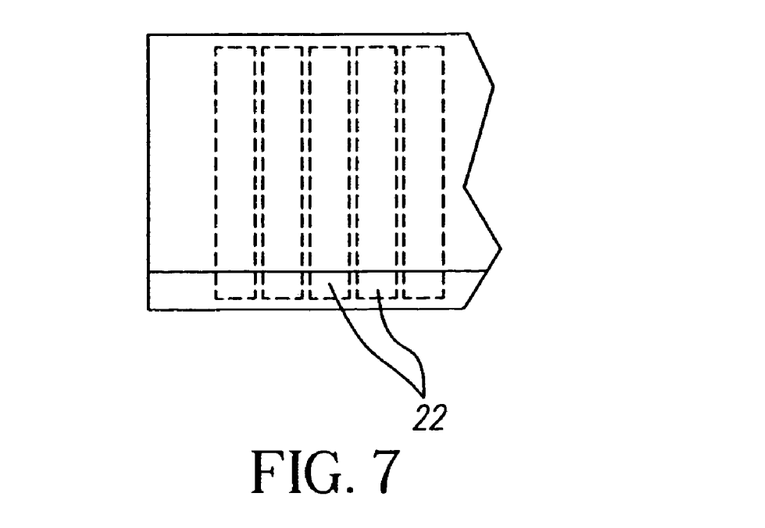
FIG. 7 is a rear view of a sheet in accordance with the present invention having exposed first conductors.

FIG. 6 is a rear view of a sheet in accordance with the present invention having a polymer dispersed chiral nematic/cholesteric liquid crystal layer 30 and a dark layer 35 (only the top dark layer 35 is viewable). In a preferred embodiment, chiral nematic/cholesteric layer 30 and dark layer 35 are co-deposited. FIG. 7 is a rear view of a sheet in accordance with the present invention having exposed first conductors. Portions of chiral nematic/cholesteric layer 30 and dark layer 35 can be removed, for example, using a solvent to form exposed first conductors 22. Alternatively, polymer dispersed chiral nematic/cholesteric liquid crystal layer 30 and a dark layer 35 are deposited in a manner that exposes transparent first conductors 20 to create exposed first conductors 22.

Figure 8:
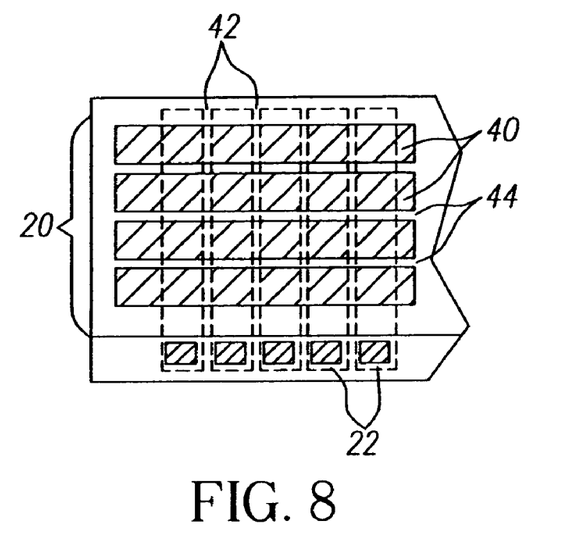
FIG. 8 is a rear view of a sheet in accordance with the present invention having printed second conductors.

FIG. 8 is a rear view of a sheet in accordance with the present invention having applied second conductors 40. Second conductors 40 in the invention comprise a set of adjacent traces organized to form, in conjunction with first conductors 20, a matrix display. Conductive material can be deposited in a vacuum environment and laser etched or conductive material can be selectively deposited, in one embodiment by screen printing, to create second conductors 40. The gap 44 between second conductors 40 is preferably kept as narrow as possible, while maintaining electrical isolation between adjacent conductors. Chiral nematic/cholesteric material disposed between conductors does not respond to applied electrical fields. Additional material can be applied with second conductors 40 to create protective coverings 24 over each exposed transparent second conductor 22.

Figure 9:
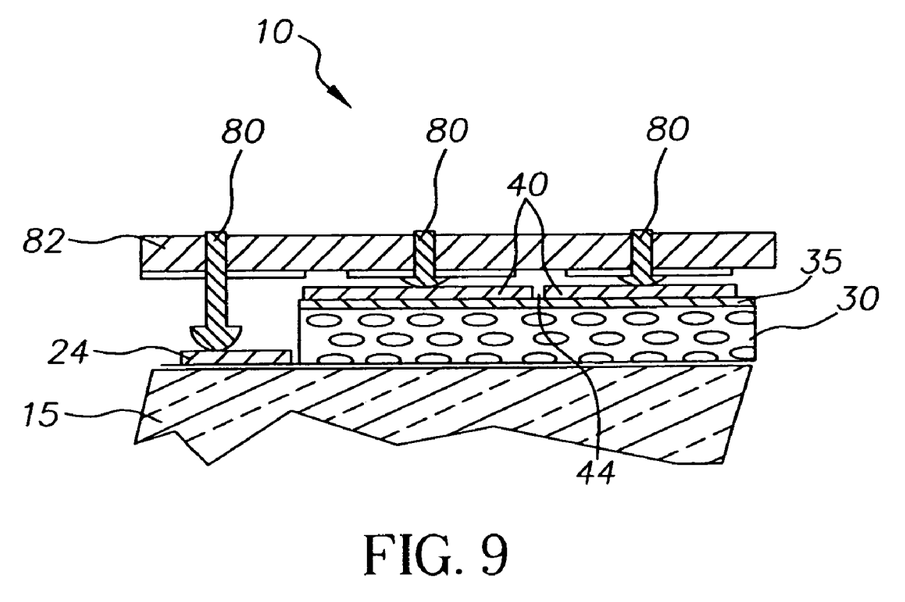
FIG. 9 is a section view of a display in accordance with the present invention attached to a circuit board.
Figure 10:
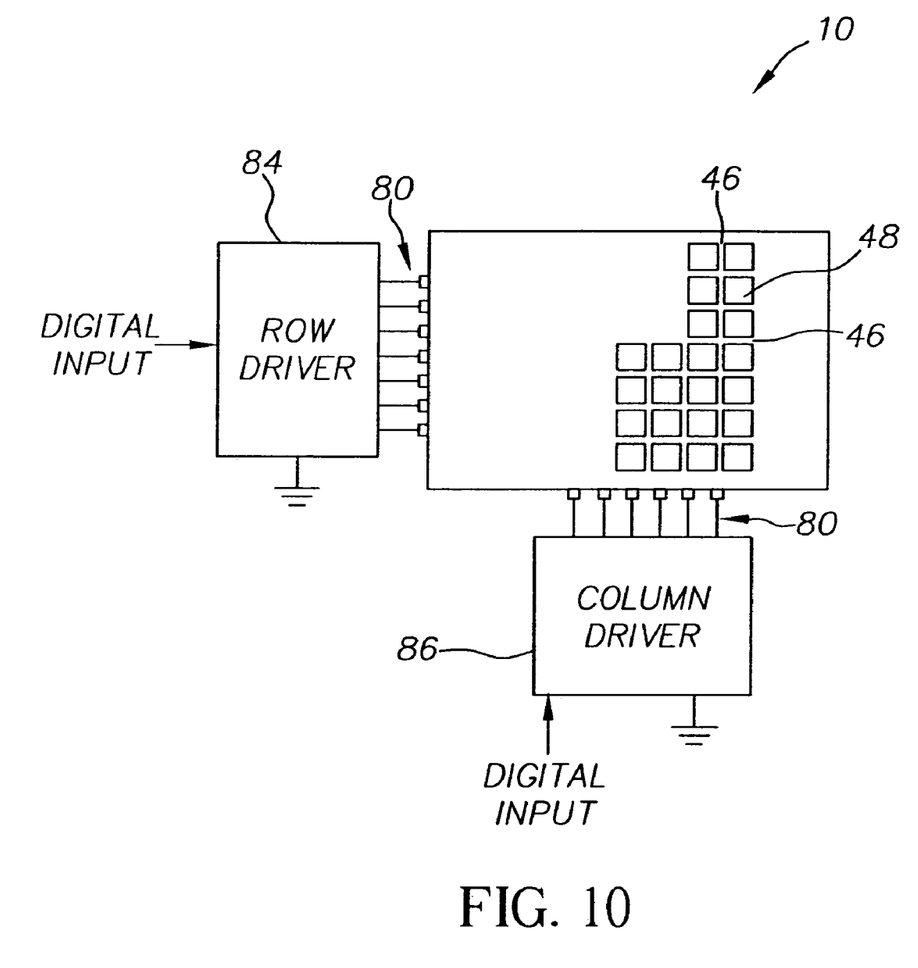
FIG. 10 is a front view of a display in accordance with the present invention connected to electric drive means.

FIG. 9 is a section view of a display in accordance with the present invention attached to a circuit board. Contacts 80 on circuit board 82 provide electrical connection to each of second conductors 40 through protective covering 24 and to each of second conductors 40. FIG. 10 is a front view of a display in accordance with the present invention connected to electric drive means. Row driver 84 is connected by contacts 80 to second conductors 40. Column driver 86 is connected by contacts 80 to first transparent conductors 20 though protective covers 24. Electrical signals can be applied to row driver 84 and column driver 86 to write images onto display 10 using conventional cholesteric drive schemes.

The reflectivity of a chiral nematic/cholesteric material can be measured using a continuous area that is electrically driven to a given optical state. In the case of a matrix display with nonoperative chiral nematic/cholesteric material in the gap between patterned conductor segments, the reflectivity of the display can be measured using areas having large numbers of pixels and associated nonoperative areas between conductors, to determine "macro-reflectivity". The ratio of macro-reflectivity of the areas having large numbers of pixels (operative areas which are affected by the electrical field) and associated nonoperative areas between conductors can further define a "macro-contrast ratio".

Figure 11:
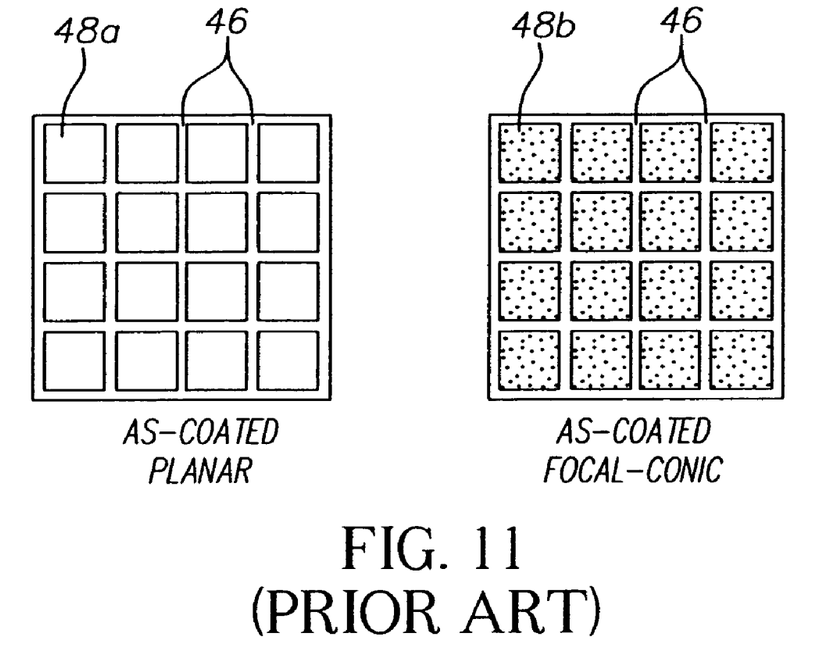
FIG. 11 is a view of prior art coated displays in the planar and focal conic states.

FIG. 11 is a view of prior art coated displays in the planar and focal conic states. Anti-parallel row and column electrodes form a matrix of pixels. In the as-coated and dried state, the polymer dispersed chiral nematic/cholesteric liquid crystal is in a bright, near planar (nP) state. Portions of liquid crystalline material display 10, located in the gap between conductor segments and are not affected by the field established between both conductors, remain in the near planar (nP) state regardless of electrical fields applied to the conductors. On the left side of FIG. 11, where the arease or pixels 48a of the chiral nematic/cholesteric matrix display are electrically driven into the planar state, there is a given macro-reflectivity which incorporates inactive chiral nematic/cholesteric material in the gaps 46 between conductor segments, which, in the as-coated state, are bright. On the right side of FIG. 11, the liquid crystal areas or pixels 48b have been electrically written into the dark, focal conic state. The bright frames around each dark pixel, formed by unaffected gaps 46 between conductor segments, significantly increase the brightness of the dark pixels, producing chiral nematic/cholesteric matrix displays with poor contrast ratio. Display quality would be improved if the bright, inactive areas 46 around each pixel were changed to a dark state to improve the contrast of matrix chiral nematic/cholesteric displays.

Figure 12:
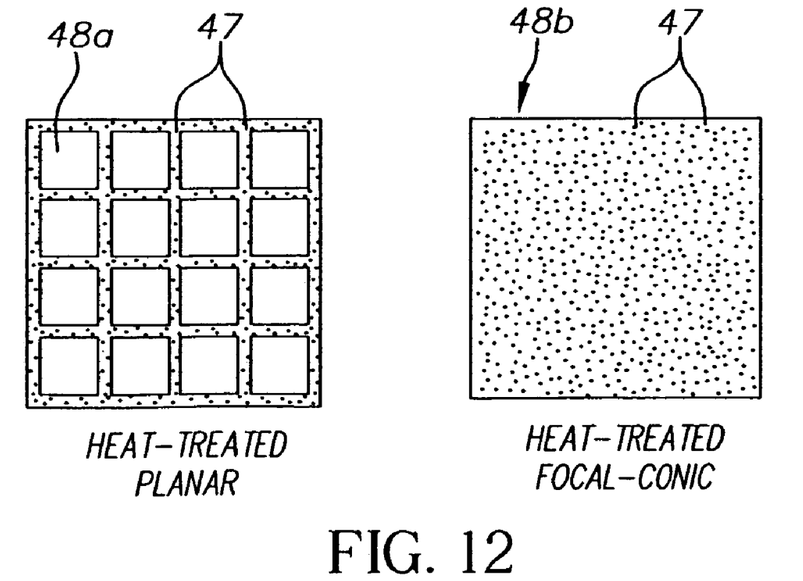
FIG. 12 is a view of heat treated coated displays in the planar and focal conic states.

As can be seen in FIG. 12, the heat treated displays have dark gaps 47 around each affected liquid crystal area or pixel 48a, written in the planar state, slightly reducing macrobrightness in the planar state. As illustrated on the right side of FIG. 12, the heat treated display written into the focal conic state appears uniformly dark because the inactive cholesteric material in the gaps 47 matches the darkness of the areas or pixels 48b of cholesteric material written into the focal conic state.

A process for fabricating display 10 will now be described. The method for making a display comprises providing a substrate having a patterned conductor thereon, applying a non-cleared liquid crystal material to the substrate, clearing the non-cleared liquid crystal material to produce a cleared liquid crystal material, applying a field to the patterned conductor to produce an image comprised of areas of cleared liquid crystal material and non-cleared liquid crystal material.

The conductor is preferably transparent and may be applied in a pattern or be applied, then patterned, as, for example, by actinic radiation. Preferably, the patterned conductor is patterned to form an array of linear conductive areas or a matrix array. The patterned conductor may also be patterned to form segments. The conductive material can be deposited in a vacuum environment and laser etched or conductive material can be selectively deposited, in one embodiment by screen printing. This pattern results in the formation of a plurality of patterned first transparent conductors. These first transparent conductors in the invention comprise a set of adjacent traces organized to form the first set of traces for a matrix display. Preferably, the gap between adjacent transparent first conductors is minimal.

A non-cleared, electrically modulated layer, for example, a chiral nematic/cholesteric liquid crystal layer, is applied over the first patterned conductor in such a way that the modulated material disposed between conductor traces in the inter-layer gap, does not respond to applied electrical fields. Preferably, a second conductive layer is applied over the electrically modulated layer, so that the modulated layer is between the first and second conductive layers. The second conductors also comprise a set of adjacent traces and are organized to form, in conjunction with first conductors, a matrix display. Conductive material can be deposited in a vacuum environment and laser etched or conductive material can be selectively deposited, in one embodiment by screen printing, to create second conductors. The gap between second conductors is preferably kept as narrow as possible, while maintaining electrical isolation between adjacent conductors. Chiral nematic/cholesteric material disposed between conductors does not respond to applied electrical fields.

The layered display is then treated to clear the non-cleared liquid crystal material to produce a cleared liquid crystal material. Preferably, clearing is accomplished by heating the liquid crystal material to above the clearing temperature of the liquid crystal material to produce a liquid crystal material in a cleared state and cooling the liquid crystal material in the cleared state at a rate sufficient to maintain the cleared state. Heating may be accomplished through any conductive, convective, or radiative method, provided that the compenets of the display being subjected to the heat treatment are not degraded.

The heat treating process is applicable to chiral nematic/cholesteric liquid crystal that have been manufactured in a way that results in areas between adjacent conductors being in a bright state. Preferably, a convective method of heat treatment is used. Suitable methods may include heating in an oven, applying a forced hot air blast blown onto surface of the display, or application of other heated gas. Typical liquid crystal material for use in displays is stable between 0C and 50C. The liquid crystal materials generall convert to the isotropic state near the boiling point of water. In a preferred embodiment, the liquid crystal material is cleared by heating to at least 50C, although the exact temperature depends on the particular liquid crystal material selected and the temperature would be easily determined by one of ordinary skill in the art.

The thermal treatment may occur any time after the liquid crystal material has been applied to a substrate, for example, after the chiral nematic/cholesteric liquid crystal layer has been applied over a first set of conductors. Preferably, heating is accomplished after the liquid crystalline material has been applied and dried. In one embodiment, heat treatment may be accomplished during the filling of cells having glass substrates. In the preferred embodiment, the heating process occurs during manufacturing. Heating may occur while the liquid crystal material is on the coating machine, or after assembly of the display. The heating process is not limited to being applied after the display is manufactured. It should be noted, however, that the thermal treatment is desirably controlled so that the components present in the display at the time of thermal treatment are not degraded by the treatment, For example, polymeric materials should not be heated to exceed their glass transition temperature. The technique of clearing may be of further use in any elecrooptical material having a manufactured bright state including inactive material between adjacent traces. In the particular case, the process is very useful for polymer dispersed chiral nematic/cholesteric liquid crystals in domains formed by limited coalescence in a gelatin binder.

Once heated and cleared, the liquid crystal material is cooled. The cooling process should be performed at a rate slow enough to permit that the chiral nematic/cholesteric material maintain a clear state until it reaches ambient temperature. Cooling may be accomplished by convective or conductive methods. Conductive methods may include conveyance incontact with a cooled surface, for example, a chiller. Convective methods may include simply exposure to ambient temperature, with or without airflow, exposure to ambient or cooled air flow over the surface of the display. Preferably, cooling occurs as soon as possible after thermal treatment. In a preferred embodiment, cooling via exposure to the ambient environment may be accomplished in 15-20 seconds.

Finally, a field is applied to the patterned conductor to produce an image comprised of areas of cleared liquid crystal material and non-cleared liquid crystal material.

The degree of improvement in macro-contrast depends on the size of the inter-conductor gap relative to the pitch of the conductors and the brightness of the chiral nematic/cholesteric material in the as-coated state. The heat treating process should always improve the contrast if the inter-conductor chiral nematic/cholesteric material is in a bright state.

In preferred embodiments, further functional layers may be applied. In one embodiment, a gel subbing layer may be applied to the substrate prior to the addition of the first conductive layer. In another embodiment, a dark layer may be applied over the liquid crystal layer. In a preferred embodiment, the cholesteric layer and the dark layer are co-deposited. Portions of the cholesteric layer and dark layer may optionally be removed, for example, using a solvent to form exposed first conductors. Alternatively, polymer dispersed cholesteric liquid crystal layer and the dark layer 35 are deposited in a manner that exposes transparent first conductors to create exposed first conductors. Additionally, material can be applied with second conductors to create protective coverings over each exposed transparent second conductor.

EXAMPLE

An experiment was performed to drive inactive cholesteric material located in between conductor segments in a polymer dispersed cholesteric display into a dark state. Displays, made in accordance with the preferred embodiment, used cholesteric material with a clearing point of 85 degrees centigrade. At that temperature, the liquid crystal material is in the isotropic state. In that state, forces ordering molecular structure of the cholesteric material at lower temperatures are disrupted by thermal energy and the material become an optically clear, unorganized material.

The displays were suspended in a heated oven having a temperature of 92 degrees centigrade. After 70 seconds in the oven, the cholesteric material in the polymer dispersed cholesteric displays had reached the isotropic state and the cholesteric material was clear. The dark layer in the displays made the displays appear black. The displays were removed from the oven at ambient temperature 22 degrees centigrade without contact to the display area. The displays maintained a clear, dark state after cooling. Referring back to FIG. 4, the near planar (nP) material reflectance had been converted to a treated reflectance, "treated", which closely matched the spectral distribution of material written in the focal conic state. If the heated display had an area that cooled too rapidly, for instance through contact with a cooler object, the cholesteric material would be converted into the planar state. The clear state was stable after cooling.

FIG. 12 is a view of heat treated coated displays in the planar and focal conic states. The heat treated displays had a dark areas surrounding each pixel written in the planar state, slightly reducing macro-brightness in the planar state. As illustrated on the right side of FIG. 12, the heat treated display written into the focal conic state was uniformly dark because the inactive cholesteric material matched the darkness of cholesteric material written into the focal conic state.

Figure 13:
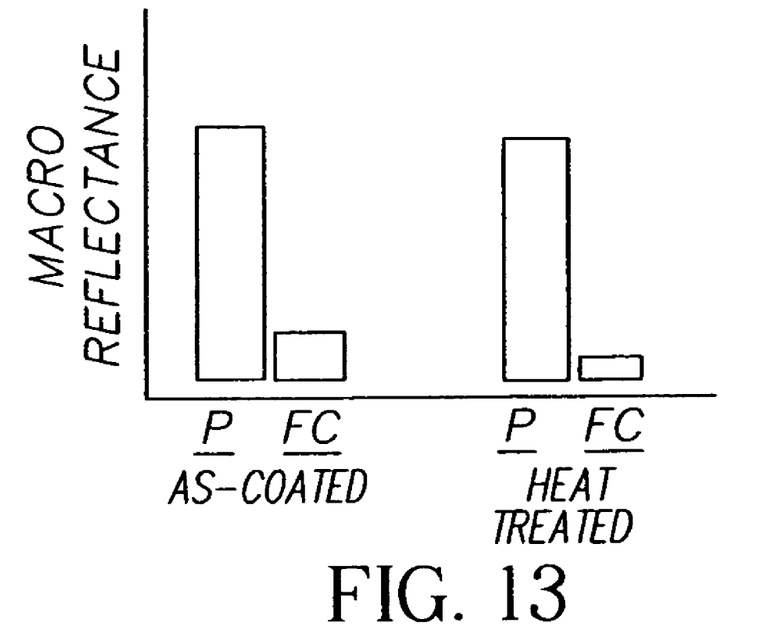
FIG. 13 graphs the planar and focal conic macro-reflectance of displays in the as-coated and heat treated states.
Figure 14:
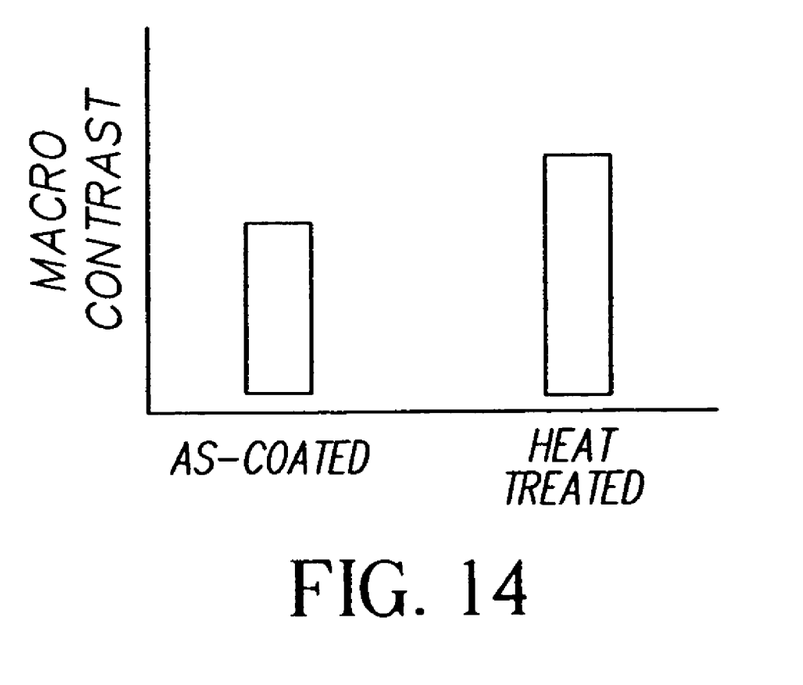
FIG. 14 graphs the macro-contrast of as-coated and heat treated displays.

FIG. 13 graphs the planar and focal conic macro-reflectance of displays in the as-coated and heat treated states. The heat treating process slightly decreased the macro-reflectance of the planar state when heat treated. The focal conic state is significantly reduced by the heat treating process. In the test case, the macro-reflectivity of the focal conic state was nearly halved. FIG. 14 graphs the macro-contrast of as-coated and heat treated displays. In the test case, the macro-contrast of the displays was nearly doubled by the heat treating process. After the coating process, the cholesteric material was in the planar state. Sheets made through that step were heated, the cholesteric material, and displays were operative after completion of the remaining processing steps.

The invention has been described in detail with particular reference to certain preferred embodiments thereof, but it will be understood that variations and modifications can be effected within the spirit and scope of the invention.

The invention claimed is:

1. A display comprising a substrate, a patterned conductor, and a liquid crystal material having cleared areas and electrically writeable areas, wherein said liquid crystal in said display is in a dried state comprising a substantial monolayer of liquid crystal domains, and wherein said liquid crystal material is in a near-planar state prior to clearing.

2. The display of claim 1 wherein said substrate is a flexible substrate.

3. The display of claim 1 wherein said substrate is a polymeric substrate.

4. The display of claim 1 wherein said patterned conductor is indium tin oxide (ITO).

5. The display of claim 1 wherein said patterned conductor is an array of linear conductive areas.

6. The display of claim 1 wherein said patterned conductor forms a matrix array.

7. The display of claim 1 wherein said patterned conductor forms segments.

8. The display of claim 1 wherein said liquid crystal material is a chiral nematic liquid crystal material.

9. The display of claim 1 wherein said liquid crystal material is dispersed in a continuous polymeric binder matrix.

10. The display of claim 9 wherein said continuous polymeric binder matrix comprises gelatin.

11. The display of claim 10 wherein said continuous polymeric binder matrix further comprises hardener.

12. The display of claim 1 wherein said liquid crystal layer comprises a substantial monolayer of domains over 75 percent of said liquid crystal layer.

13. The display of claim 1 wherein said liquid crystal layer comprises liquid crystal domains and wherein said domains are flattened spheres having an average thickness substantially less than their length.

14. The display of claim 13 wherein said average thickness is 50% less than said length.

15. The display of claim 13 wherein said domains have a thickness to length ratio of from 1:2 to 1:6.

16. The display of claim 13 wherein said domains have a ratio of maximum to minimum domain size of less than 2:1.

17. The display of claim 1 wherein said cleared areas are in the isotropic state.

18. The display of claim 1 wherein said cleared areas closely match the spectral distribution of said electrically writeable areas, when said electrically writeable areas are written in the focal conic state.

19. The display of claim 1 further comprising a second conductor.

20. The display of claim 19 wherein said second conductor is patterned.

21. The display of claim 1 further comprising functional layers.

* * * * *